June 3, 1952   C. OTTO   2,599,067
PRODUCTION OF AMMONIUM SULFATE
Filed March 15, 1948   5 Sheets-Sheet 1

Fig.1

INVENTOR
CARL OTTO
BY
John E. Hubbell
ATTORNEY

FIG.2

June 3, 1952  C. OTTO  2,599,067
PRODUCTION OF AMMONIUM SULFATE
Filed March 15, 1948  5 Sheets-Sheet 3

FIG. 3

INVENTOR
CARL OTTO
BY
John E. Hubbell
ATTORNEY

June 3, 1952  C. OTTO  2,599,067
PRODUCTION OF AMMONIUM SULFATE
Filed March 15, 1948  5 Sheets-Sheet 5

FIG. 5

INVENTOR
CARL OTTO
BY John E. Hubbell
ATTORNEY

Patented June 3, 1952

2,599,067

UNITED STATES PATENT OFFICE 2,599,067

PRODUCTION OF AMMONIUM SULFATE

Carl Otto, Manhasset, N. Y.

Application March 15, 1948, Serial No. 14,902

In Great Britain December 17, 1947

19 Claims. (Cl. 23—119)

The general object of the present invention is to provide an improved method of, and improved apparatus for producing crystalline ammonium sulphate and sulphuric acid to thereby other distillation gas containing ammonia into scrubbing contact with liquor containing ammonia sulphate and sulphuric acid to thereby increase the ammonium sulphate content of the liquor, and thereafter crystallizing ammonium sulphate from the liquor.

A major object of the invention is to provide a method and apparatus for producing sulphate of ammonia which are substantially free from practically important disadvantageous characteristics of the methods and apparatus heretofore commercially used in this country in converting the ammonia content of coke oven gas into sulphate of ammonia.

In converting ammonia in coke oven gas into ammonium sulphate by the method in most general use in this country, now and in the past, the gas is injected into a body of bath liquor containing saturated ammonium sulphate solution and sulphuric acid which is held in the lower portion of a saturator of the "cracker pipe," or submerged gas inlet orifice type. A saturator of the "cracker pipe" type comprises a gas space above the liquor bath and into which the gas bubbles up out of the liquor bath into which it has been injected, and necessarily operates with a gas pressure drop. A desirable form of that type of saturator, having greater capacity per unit of bulk, and operating with a smaller gas pressure drop than prior "cracker pipe" type saturators, is shown in my prior Patent 2,424,206 of July 15, 1947.

The use of a saturator of the "cracker pipe" type in the production of ammonium sulphate, has practically important disadvantages. For one thing, it is practically essential that even the most efficient saturator of the "cracker pipe" type should be of relatively large bulk, and inherently expensive to construct, maintain and operate. Furthermore, the gas pressure drop in such a saturator under normal operating conditions must be large enough to significantly increase the required capacity and operating cost of the machinery employed to move the gas through the saturator. Moreover, in the operation of a saturator of the "cracker pipe" type, solid ammonium sulphate deposits on and adheres to the "cracker pipe" and the internal surface of the saturator wall. The elimination of such deposits, commonly called rock salt, is troublesome and expensive and customarily requires a periodical bath killing operation. Each bath killing operation involves the replacement or substantial dilution of all or a substantial portion of the bath liquor in the saturator, by water which dissolves the rock salt.

Aside from the above-described method of using the "cracker type" saturator, the only prior method of converting the ammonia content of coke oven gas into ammonium sulphate in commercial use in this country, is a method described by W. Tiddy in the periodical "Blast Furnace and Steel Plant" for December 1941. In that method, the ammonia is scrubbed out of the gas in a scrubbing column containing a stack of grids, usually tiles, over and through the spaces in which liquor containing unsaturated ammonium sulphate and free sulphuric acid components, flows downwardly while the gas scrubbed flows upwardly. The amount of ammonia absorbed by the stream of liquor flowing down past the grids must be kept too small to supersaturate the ammonium sulphate solution in said streams as such supersaturation would result in rock salt deposits in the grid stack, clogging the latter and increasing the gas pressure drop in the scrubber.

The bath liquor which flows away from the grid stack, is passed from the lower end of the scrubbing column to crystallizing apparatus comprising a crystallizing tank and an elevated evaporator operating under a vacuum. Liquor is pumped into the evaporator from the crystallizing tank. Vaporization in the evaporator eliminates some water from the liquor and lowers the liquor temperature and thereby supersaturates the unevaporated portion of the liquor. Supersaturated liquor is returned through a barometric column connection to the crystallizing tank in which it is desupersaturated as a result of the formation and growth of ammonium sulphate crystals in said tank. The gas pressure drop in the scrubbing column used in the second method may be substantially lower than the pressure drop in the "cracker pipe" saturator, but that advantage is attended by some disadvantages including, in particular, the need for the use of a vacuum evaporator.

In accordance with the present invention, I first produce supersaturated ammonium sulphate by spraying finely divided liquor containing sulphuric acid and ammonium sulphate into a substantially unobstructed scrubbing space or chamber through which a stream of coke oven gas containing ammonia is flowing, whereby the ammonia and acid react to form the additional ammonium sulphate to supersaturate the ammonium sulphate liquor sprayed into said space. Ordinarily, the ammonium sulphate liquor sprayed into the scrubbing space is saturated, though it is theoretically possible to have the entering spray liquor unsaturated or supersaturated. The spray liquor supersaturated in the scrubbing space or having its degree of supersaturation increased in said space, is then collected in a crystallizing space without necessary change in the temperature or pressure of the liquor. My method thus eliminates the need for using the characteristic "cracker pipe" saturator of the prior method first described, and eliminates the need for using the grid stack and vacuum evaporator used in the second mentioned prior method.

The gas scrubbing space and the liquid crystallizing space used in accordance with the present invention may be respectively formed by the upper and lower portions of a single tank through which the gas passes upwardly and the spray liquor passes downwardly. Advantageously, however, the crystallization is effected in a tank or other receptacle which is separate from the scrubbing chamber tank and which also serves as a tar separator. In an especially desirable form of the invention, the crystallizer comprises a liquid seal between the scrubbing and crystallizing chambers. The crystallizing chamber which is separate from the scrubbing chamber and also comprises a pipe or conduit conveying liquor to the crystallizing chamber from the scrubbing chamber, may also serve as a tar separator. In the crystallizer, the liquor changes from a supersaturated condition into a normal saturated condition.

In the practice of the present invention, ammonium sulphate crystals are formed, and crystals grow in the small liquor drops or particles sprayed into and moving through the scrubbing chamber as the sulphuric acid in said drops or particles unites with ammonia in the gas contacted and thereby supersaturate the liquor in said drops or particles. In all of the forms of the invention disclosed herein, ammonium sulphate crystals are entrained in the liquor sprayed into the scrubbing chamber. In the preferred forms of the invention illustrated in Figs. 3, 3A and 4, at least some of the liquor sprayed into the scrubbing space entrains crystals withdrawn from the portion of the crystallizer in which the larger crystals accumulate. The crystal entraining liquor sprayed into the scrubbing space reacts therein with the ammonia content of the coke oven gas to form ammonium sulphate and thereby supersaturates itself while simultaneously subjecting itself to a desupersaturating action in which ammonium sulphate in the liquor is deposited on the entrained crystals, which are thus caused to grow as they move through the scrubbing space. The major portion of the crystal growth effected and some of the initial formation of crystals effected in the normal use of the invention, occurs in the crystallizing space. The evaporation of water from the ammonium sulphate liquor which occurs in the scrubbing and crystallizing spaces, increases the supersaturation of the liquor from which the water vapor separates. The crystal growth and formation which results from the supersaturation of ammonium sulphate, reduces the amount of ammonium sulphate in solution and thus desupersaturates the ammonium sulphate solution.

In the preferred form of the invention, crystallization is expedited and augmented by recirculation of the spray liquor in the crystallizer space. The ammonium sulphate containing liquor sprayed into the scrubbing space ordinarily consists wholly or mainly of liquor passed more or less directly to the spraying means from the crystallizer. Ammonium sulphate liquor is thus moved along a flow path which is continuous, or closed on itself, and includes the means for spraying the liquor into the scrubber, the scrubbing space, the crystallizing space and conduit connections and pumping means for passing liquor from the last mentioned space to said spraying means. Sulphuric acid must be added to the liquor at some convenient point or points along said flow path and ammonium sulphate crystals must be separated from the liquor. The liquor pumping apparatus required to spray the liquor into the scrubbing space, may serve to produce all, or a major portion of the recirculation of the bath liquor in the crystallizer space which is needed to effect and regulate the crystallizing action.

A further specific object of my invention is to provide a simple and effective method of, and means for preventing rock salt deposits on the walls enclosing the scrubbing and crystallizing space. I have found that the last mentioned object may be substantially obtained by suitably heating, suitably washing, or both heating and washing the wall or walls on which rock salt would otherwise deposit. A suitable wall heating effect may be obtained by a steam jacket or jackets, or by electrical heating structure heating the wall to a temperature high enough to prevent ammonium sulphate crystals from becoming attached to the inner wall surface. The wall washing effect may be obtained by flowing water or bath liquor along the wall in a film-like stream of sufficient volume and flow velocity to prevent ammonium sulphate crystals in said stream from adhering to said wall.

In the practice of my method, as in the practice of the two prior methods hereinbefore described, the gas passing away from the apparatus in which the ammonia content of the gas is recovered, entrains bath liquor which is recovered in a so-called acid catcher. Such recovery is practically essential in all cases because the cost of the sulphuric acid used is a major cost item in the process, and also because the inclusion of more than a trace of sulphuric acid in the gas makes the latter undesirably corrosive. In the practice of the present invention I have found that a decrease in the average size of the subdivided liquor particles sprayed into the gas stream increases the absorption efficiency of the sprayed liquor but also tends to increase the amount of the gas entrained liquor carried into the acid catcher. A specific object of the present invention is to make it possible to obtain the advantage of spraying finely sub-divided liquor into the scrubbing space while minimizing the passage of the finely sub-divided liquor into the acid catcher.

I have discovered that the last mentioned object of the invention may be obtained by spraying bath liquor which is sub-divided relatively coarsely into the gas as it passes through the portion of the scrubbing chamber, preferably the upper portion, adjacent the gas outlet of said chamber, and simultaneously spraying relatively finely sub-divided liquor into the portion of the scrubbing chamber more remote from the gas exit to the acid catcher. Preferably the amount of finely sub-divided liquor sprayed into the gas is sufficient to absorb the major portion of the ammonia content of the gas. With this spraying procedure, the relatively coarse liquid particles engage and absorb, or coalesce with finer particles of liquor sprayed into the portion of the scrubbing space more remote from the exit. By the use of a suitably large portion of the spray liquor in the form of a coarse spray, substantially all of the fine liquor particles entrained in the gas stream may be eliminated from said stream. The coarse spray serves to absorb substantially all of the ammonia content of the gas not absorbed by the fine spray.

A plurality of pumps may be used with advantage in some cases to supply acidified liquor to the several spraying devices and to effect the desired recirculation of the liquor required for the desired crystal growth, but it is practically possible to use only a single pump.

In the practical use of the present invention, I have found that good operating results are obtainable with a gas upflow velocity in the scrubber of from 1 to 23 feet per second, and with liquor sprayed into the upper portion of the scrubber adjacent the gas outlet in the form of a coarse spray comprising liquor particles or droplets having an average diameter of more than two millimeters, and with liquor sprayed into a lower portion of the scrubber in the form of a fine spray comprising particles or droplets having an average diameter slightly below 0.5 millimeter. In such operation, most of the fine liquor spray entrained in the gas stream is knocked out of the latter by the coarse spray in the upper portion of the scrubbing space, and the amount of acid carried into the external acid catcher by the outflowing gas is relatively very small. In such practical use of the invention I have found that for the satisfactory removal of the ammonia in the coke oven gas passing through the scrubber, without passing an excessive quantity of spray liquor to the acid catcher and without requiring excessively large scrubber dimensions, the total quantity of liquor sprayed into the scrubber should ordinarily exceed 3000 gallons per short ton of ammonia sulphate produced.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
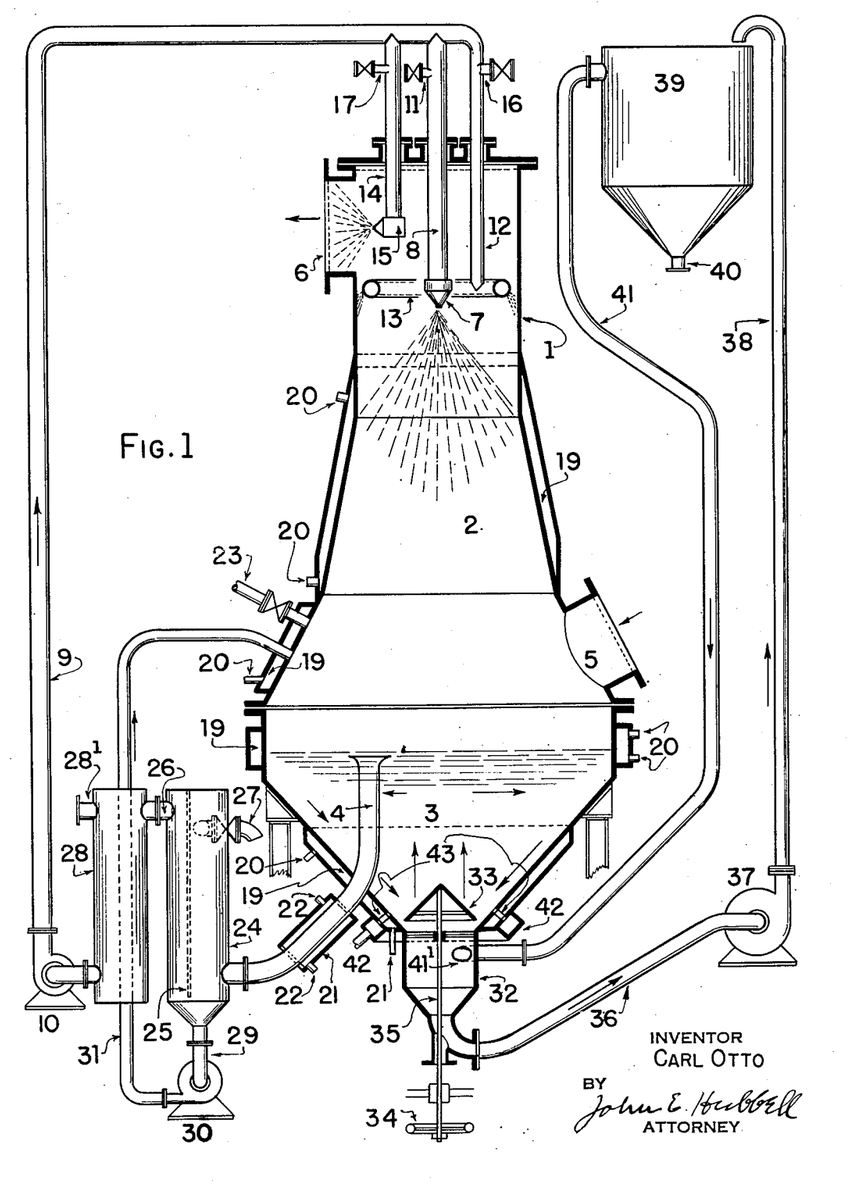
Fig. 1 is a somewhat diagrammatic sectional elevation of one form of my improved apparatus for utilizing the ammonia content of coke oven gas in the production of crystalline ammonium sulphate.

The apparatus shown in Fig. 1 comprises a vertically disposed tank or casing structure 1 enclosing an upper gas scrubbing space or chamber 2, and a lower liquid holding crystallizing space or chamber 3. The gas and liquid holding spaces or chambers 2 and 3 of Fig. 1 are in open communication with one another at the level at which liquid overflows from the space 3 into the overflow outlet pipe 4. The tank 1 is preferably circular in cross-section and may well be of uniform diameter from top to bottom. As shown, however, the lower liquid holding portion of the tank is of conical or hopper bottom shape, and the gas space 2 is tapered so that it is larger in horizonal cross-section at its lower end than at its upper end. The gas to be scrubbed enters the lower portion of the gas space 2 through an inlet 5 and passes away from the upper end of the space through an outlet 6.

In accordance with the present invention, acidified ammonium sulphate liquor is sprayed into the scrubbing chamber 2 at the upper end of the latter through a central, downwardly directed, spray nozzle 7. The latter is connected to the lower end of a vertically disposed pipe 8 which enters the space 2 through the top wall of the latter, and which forms a branch of the outlet pipe 9 of a pump 10 normally discharging saturated ammonium sulphate liquor under pressure. As shown, sulphuric acid may be added to the liquor passing to the nozzle 7 through the pipe 8, by a valved acid supply pipe 11. The pipe 9 also supplies ammonium sulphate liquor through a branch pipe 12 to a horizontal spray ring 13 in, and adjacent the upper end of the scrubbing chamber 2. The spray ring 13 is formed with a multiplicity of discharge orifices distributed about the axis of the tank 1 and directed downwardly and outwardly so as to maintain a film-like stream of liquid flowing downward along the peripheral wall of the chamber 2. Through a third branch 14, the pipe 9 supplies liquor to one or more spray nozzles 15 provided near the gas outlet 6. The spraying devices 13 and 15 flush with bath liquor the inside walls of the gas space 2 and gas outlet 6. The liquid discharged by the spray nozzles 13 and 15 minimizes rock salt deposits on the wall surfaces flushed or washed by said liquid.

While in normal operation, the flushing liquid discharged through the nozzles 13 and 15 may be saturated ammonium sulphate liquor, the branch supply pipes 12 and 14 are shown as provided with valved pipe connections 16 and 17 through which hot water or hot water admixed with more or less saturated ammonium sulphate liquor, may be supplied to the nozzles 13 and 15, respectively, when necessary to eliminate rock salt deposits in the saturator. Further protection against rock salt deposits, is provided by the wall heating jackets 19 surrounding different portions of the tank structures, with pipe connections 20 for the passage of steam into, and the discharge of water of condensation from the different heating jackets. The temperature of the wall portions surrounded by the jackets 19 may be kept high enough to prevent rock salt deposits on the internal surfaces of the wall portions respectively adjacent the different steam jackets.

As shown, an external portion of the overflow pipe 4 is surrounded by a steam jacket 21, having pipe connections 22. A valved pipe connection 23, shown as opening into the scrubbing chamber 2 adjacent its lower end, forms a second means through which sulphuric acid may be added to the liquor in the subjacent crystallizing chamber. The pipe connection 23 forms an especially appropriate means for making use of the reclaimed acid from a benzol recovery plant (not shown) through which the coke oven gas is passed subsequent to its passage through the scrubbing chamber 2.

The overflow pipe 4 passes the overflowing liquor into the lower portion of a seal pot receptacle 24 at one side of a baffle 25 which does not extend to the bottom of the receptacle, but does prevent tar entering the receptacle 24 through the pipe 4, from passing out of the receptacle through the overflow pipe 26 at the opposite side of the baffle 25. The receptacle 24 serves as a tar separator of well known type, and a valved pipe connection 27 from the lower portion of the receptacle 24 at the right of the baffle 25 forms a means through which tar collecting in the upper portion of said receptacle portion may be periodically discharged. The overflow outlet 26 from the clear liquor chamber of the receptacle 25 at the left of the baffle 25, opens into the upper end of an overflow receptacle 28. The latter serves as a liquor supply chamber for the pump 10. The latter has its inlet connected to the lower end of the overflow receptacle. As shown, the receptacle 28 is provided with overflow outlet 28' through which overflowing liquor may be passed into a conventional mother liquor reservoir (not shown). The tar separator 25 has a bottom outlet 29 connected to the inlet of a liquor circulating pump 30. The latter, as shown has a discharge pipe 31 opening into the lower portion of the scrubbing chamber 2.

The conical, liquor containing, crystallizing chamber 3 opens at its lower end into a subjacent crystal receiving chamber 32. The latter is in the form of a vertically disposed cylinder and has an open upper end which is in communication with the lower end of the conical crystallizing chamber 3 to an extent which may be variably restricted by the adjustment of a valve 33. The valve 33 may be vertically adjusted by means of a hand wheel 34 secured to the lower end of the spindle 35 of the valve 33. The crystal chamber 32 has a bottom outlet connected by a pipe 36 to the inlet of a slurry pump 37 discharging through its outlet pipe 38 into an elevated crystal settling tank 39. The latter is provided with a bottom outlet 40 through which crystals may be discharged to a crystal drying filter or centrifuge device such as the device 77 shown in Fig. 3. Liquor passes away from the upper portion of the settling chamber 39 through an overflow pipe 41 and is returned to the chamber 32 through a tangential inlet 41'. Communication between the crystal receiving chamber 32 and the crystallizing chamber 3 may be cut off or throttled by the valve 33 as conditions make desirable.

To effect or augment recirculation and thereby further the crystallizing action in the chamber 3, air, gas or liquor may be injected into the body of liquor in the lower portion of the chamber 3 through the distributed outlet nozzles 43 from a spray ring 42. The jets discharged through the nozzles 43 also reduce the amount of relatively small crystals entering the chamber 32.

In the normal contemplated operation of the apparatus shown in Fig. 1, coke oven gas is continuously passed into the scrubbing chamber 2 through the lower inlet 5, and passes away from the chamber 2 through the upper outlet 6. As the gas passes upward through the scrubbing chamber 2 and thence through the outlet 6, it is subjected to the scrubbing action of the bath liquor sprayed into said chamber. The major portion of the scrubbing and wall washing liquor needed, is supplied to the scrubbing chamber through the nozzle 7, and is so sub-divided and directed as to be dispersed throughout the entire cross-section of the portion of the scrubbing chamber 2 between spaced apart upper and lower levels, respectively below the nozzle 7 and above the gas inlet 5. Furthermore, the amount of liquid discharged by the nozzle 7 needs to be sufficient to absorb all of the free ammonia carried into the scrubbing chamber by the gas, except the relatively small portion of said ammonia which is absorbed by the liquor supplied by the spraying devices 13 and 15, most of which passes downward to the crystallizing space 2 in the form of a down-flowing film on the tank wall. Substantially all of the free ammonia is normally removed from the gas before the latter passes into the space into which liquor is sprayed by the nozzle or nozzles 15. The primary purpose of the spray nozzles 15 is to flush the inside surface of the upper portion of the scrubber shell and gas exit pipe.

The spray liquor passing down through the scrubbing chamber 2 is supersaturated when it reaches and passes into the body of liquor in the crystallizing space 3. The liquor film flowing down the portion of the tank wall surrounding the scrubbing chamber 2 and absorbing ammonia from the gas coming into contact therewith, has its ammonium sulphate content increased by spray liquor discharged by the nozzle 7 and passing into said film after passing through enough of the gas space to become supersaturated. While the liquor forming the film flowing down the wall normally consists of supersaturated ammonium sulphate, it has but little tendency to form rock salt deposits on the wall of the chamber 2, if the volume of the film liquor is sufficient to provide an adequate flushing or wall washing action. When such deposits occur, or tend to occur, hot water may be added through the connections 16 and 17, to the liquor passing through the nozzles 13 and 15 as required to prevent or remove such deposits. Moreover, the formation of rock salt deposits on the walls surrounding the chambers 2 and 3 may be substantially prevented by the heating action of the steam jackets 19 which may be used to heat the film of ammonium sulphate in immediate contact with the tank wall so as to thereby reduce the supersaturation of the film liquor sufficiently to prevent rock salt deposits on the tank wall.

While the liquor passing into the liquid filled crystallizing space 3 from the scrubbing chamber 2 may be highly supersaturated, it is quickly desupersaturated as ammonium sulphate crystallizes out of solution to form seed crystals or to become part of the crystal growth which occurs in the crystallizing chamber and increases the size of the crystals therein. The growth of the crystals is expedited and augmented by the recirculation of the liquor in the crystallizing chamber due to the action of pumps 10 and 30. All, or the major portion of the liquor drawn from the crystallizing chamber by each of those pumps is returned to that chamber through one or more of the spray nozzles 7, 13 and 15, and the pipe 31.

In the crystallizing space, the larger crystals settle more rapidly than do the smaller crystals. In consequence, the crystals passing away from the crystallizing chamber through the overflow pipe 4 are of smaller average size than the crystals withdrawn from the crystallizing chamber through the crystal chamber 32. The liquor returned to the chamber 32 through the pipe 41 carries with it much of the small crystal content passed into the crystal separating tank 39 through the pipe 38. The small crystals in the chamber 32 tend to continuously increase in size. As those skilled in the art will recognize, the average size of the crystals produced may be regulated by varying the conditions of operation of the apparatus disclosed herein. Furthermore, known special expedients may be used to produce large crystals when such crystals are desired.

It is practically desirable that the scrubbing liquor spray should contain saturated rather than unsaturated or supersaturated liquor, and it is essential that in normal operation the liquor which has been sprayed into the scrubbing chamber or space 2, should be in a supersaturated condition when it passes from that chamber into the crystallizing chamber or space. However, a considerable variation in the extent or degree of supersaturation is permissible, and in normal practice it is generally desirable that the supersaturation should not be so high that seed crystals of ammonium sulphate will be formed in the crystallizer bath liquor rapidly enough to interfere with the desired crystal growth.

As those skilled in the art understand, the liquor which I use to scrub free ammonia out of coke oven gas in the production of ammonium sulphate, consists mainly of ammonium sulphate solution along with some sulphuric acid and a small amount of ammonium sulphate in crystal form. The reaction between ammonia and sulphuric acid is exothermic and increases the temperature of the liquor. The coke oven gas coming to the scrubbing chamber 2 carries some water vapor and is at a temperature which normally is within the range of 120° to about 150° F. When the gas coming into the scrubber has a constant temperature and water vapor content, the liquor composition stabilizes with ammonium solution dilution dependent on the said temperature and the water vapor content of the gas. An increase or decrease in the water vapor content of the gas, without a compensating change in the gas temperature, results in a decrease or increase respectively, in the ammonium sulphate content of the liquor, when the sulphate is in its normally saturated condition.

In continuous commercial use, in the general manner above described, of apparatus of the type and form shown in Fig. 1, good operating results are obtained when the average gas temperature in the scrubbing space 2 and liquor temperature in the crystallizing space 3 are each between 120° F. and 150° F., and the liquor in the chamber or space 3 has an average acid content of about 5 or 6 percent, and average density of about 1.3, and above 3000 gallons of liquor is sprayed into the scrubbing space 2 for each 2000 pounds solid ammonium sulphate produced. Neither the precise acid content of the liquor in the crystallizing space 3 or being sprayed into the scrubbing space 2, nor the precise density of the liquor in either space is critical. Ordinarily, it is practically undesirable to have the acid content of the liquor in the crystallizing space or chamber above 6 per cent, since a higher acid content in said space tends to result in an acid content in the finished crystalline ammonium sulphate produced, which, while small, is objectionable, particularly because of its corrosive effect. It is practically essential, of course, that the acidity and volume of the liquor sprayed into the scrubbing space 2 should be high enough to insure the conversion of all the ammonia content of the gas into ammonium sulphate.

The liquor sprayed into the space 2 should be sufficient in amount, and suitably dispersed, to keep a substantial portion, at least, of the vertical extent of the space 2 filled with the liquor spray, and the amount of spray liquor and its initial acid content should be such as to prevent a reduction in the acid content of the spray liquor in the scrubbing space below about 4 percent. Thus, for example, if the spray liquor passing through the nozzle 7 of Fig. 1 has an acid content of 9 percent, the liquor passing into the crystallizing space bath from the scrubbing space 2 should have an average acid content of not less than about 5 percent.

The amount of spray liquor used should be sufficient to prevent the sulphate of ammonia content of the spray liquor from rising more than about 5.4 percent above the saturation content, as otherwise the supersaturation of the liquor passing from the scrubbing space to the crystallizing space will become high enough to cause the formation of an undesirably large number of small crystals, with an undesirable resultant reduction of the capacity of the supersaturated liquor passing into the crystallizing space 3 to produce a suitably great crystal growth in said space. The differences mentioned in the immediately preceding paragraphs between the acid content of the liquor sprayed into the scrubbing chamber, and the acid content of the supersaturated ammonium sulphate passing from the scrubbing space into the crystallizer space, are differences existing when the amount of spray liquor used in the production of a ton of ammonium sulphate approaches the minimum, and are decreased when the amount of spray liquor used is increased to increase the crystal growth and the size of the crystals produced. The progressive increase in horizontal cross-section of the scrubbing space as the distance below the spray device 7 increases, coupled with the expanding cross-section of the liquor spray as the distance below the nozzle 7 increases, has the theoretical but practically unimportant effect of permitting a substantial portion of the vertical extent of the scrubbing space to be kept filled with the spray discharged by the nozzle 7, without causing much of the spray to impinge against the wall surrounding the scrubbing space.

Figure 3:
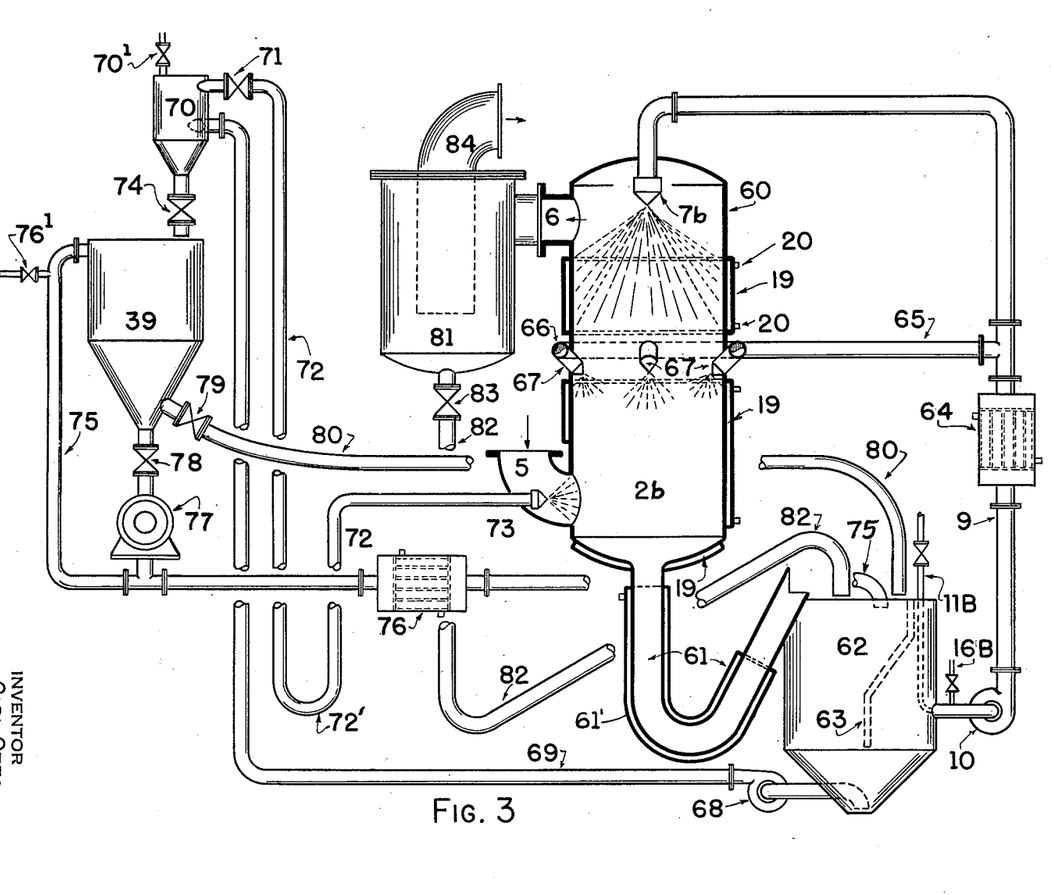
Figures 3A, 4:
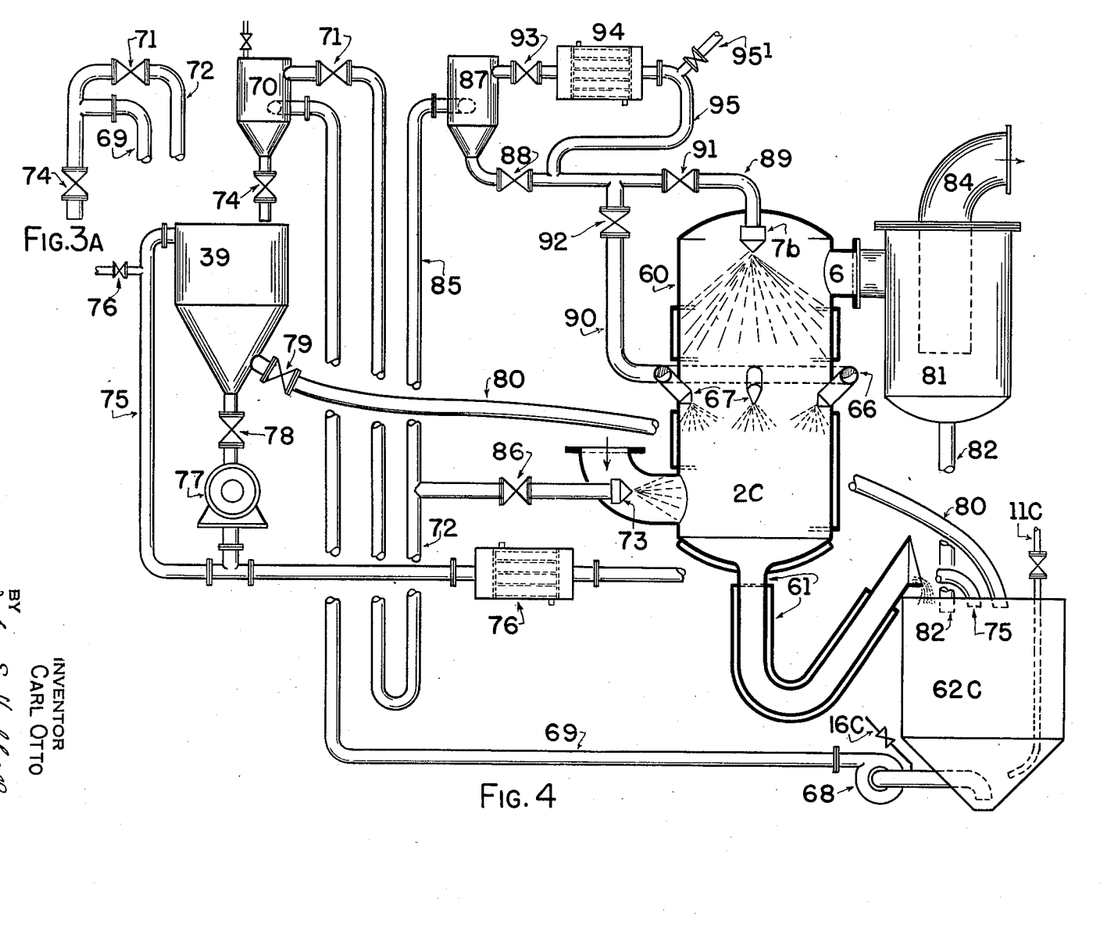
Fig. 3A is an elevation illustrating a modification of parts of the apparatus shown in Fig. 3.
Figure 5:
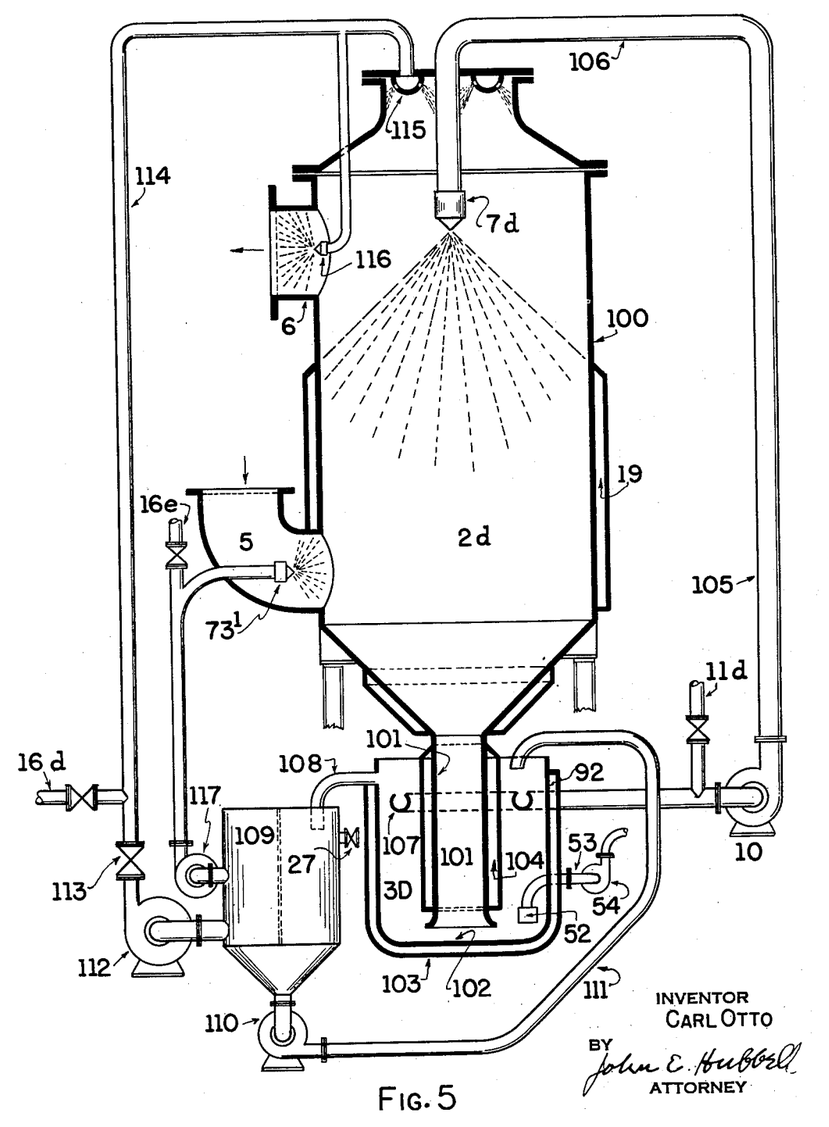

In the normal use of the invention, the acidity of the bath liquor is advantageously measured in any usual or suitable manner, continuously or at frequent intervals, and the rate at which acid is added to ammonium sulphate liquor in the tank 1 through the valved pipe connections 11 and 23 or otherwise, is increased or decreased in accordance with the measurements. In general, it is practically feasible to supply make-up acid to the liquor circulating system at any convenient point. With apparatus of the type shown in Fig. 1, the acid may be added in whole or in part through the pipe 11 to the scrubbing liquor about to be sprayed into the scrubber, or through the pipe 23 to the portion of the scrubber space immediately above the crystallizer bath space, or the acid may be passed into the crystallizing bath at various points as is illustrated in Figs. 3 and 4, or into inlet of the pump 10 as is shown in Fig. 5.

The supersaturated liquor passing from the scrubbing space 2 into the crystallizing space 3 is desupersaturated in the last mentioned space as a result of the loss of ammonium sulphate from the liquor to the crystals growing and formed in the chamber 3. In consequence of the crystal growth and the resultant desupersaturation of the liquor, saturated liquor overflowing from the tar separator normally contains a relatively small amount of small crystals and practically no large crystals, since the latter settle out in the crystallizer spaces.

The removal of tar in such manner as to keep the amount of tar in the crystallizing space relatively small, favors the production of ammonium sulphate having a good white appearance. When necessary to facilitate a desirably rapid removal of tar from the tank 24 through the valve discharge outlet 27, liquor may be passed into the tank 24 through the overflow tank 28 from the mother liquor reservoir (not shown). By keeping the crystals in suspension in the crystallizing space and removing them from the bath at a controlled rate, the size of the crystals produced can be controlled by the operator to meet the requirements of the trade. In this way, large crystals can be produced, for example, crystals of an average size such that 40 percent thereof are too large to pass through a 35 mesh screen, and 5 percent or less will pass through a 70 mesh screen. The return of liquor from the lower end of the tar separator 24 to the tank 1 by the pump 30, not only desirably augments the recirculation in the crystallizer space 3 and effects the removal of the tar from the space 3, but contributes to the production of large crystals by desirably minimizing the number of small crystals sprayed into the scrubbing space through the nozzles 7, 13 and 15. The crystal growth in the crystallizer space 3 is relatively rapid, particularly as a result of the agitation or relative movement of the liquor and crystals which increases the extent of contact of the crystals with supersaturated liquor. The liquor in the space 3 of Fig. 1 is agitated and given motion as a result of the operation of each of the pumps 10 and 30, and the liquor agitation may be further increased by air, gas or liquor injected into the chamber 3 through the nozzles 43.

Apparatus constructed in accordance with the present invention is characterized by its relatively small bulk relative to output. Thus, for example, I have found that it is practically feasible to pass coke oven gas at the rate of 80 million cubic feet per 24 hour day through a tank of the general form and proportions of the tank 1 of Fig. 1, with an internal diameter of 11 feet at the top of the bath and of 8 feet at the level of the gas outlet 6. No prior apparatus for the recovery of ammonia from coke oven gas of any type known to me has as great a capacity per unit of bulk. In consequence of its relatively small bulk, it is readily feasible from the practical economic standpoint to make all of the apparatus exposed to contact with the bath liquor, of an alloy, preferably Monel metal, which is immune to corrosive attack by the bath liquor with its substantial sulphuric acid content.

The operating efficiency of the apparatus shown in Fig. 1, may, and ordinarily will be augmented by returning to the tank 1 the liquor separated from the gas in the acid catcher through which the gas is passed from the scrubbing space outlet 6, and by returning to the tank 1 the liquor separated from the crystals passing from the crystal settling tank 39 through its outlet 40 to the crystal drying apparatus. No acid catcher or crystal drying devices are shown in Fig. 1, but they may be of any usual or suitable type, and may be arranged as are the acid catcher 81 and the crystal dryer 77 shown in Fig. 3.

As has been previously stated, the general principles and advantages of the invention may be utilized and realized with apparatus quite different in form from that shown in Fig. 1. Examples of some such other forms of apparatus are illustrated in some detail in Figs. 2, 3, 4 and 5. Each of those figures includes some elements and characteristics similar in function and purpose to, and not significantly different in form from corresponding elements and characteristics shown in Fig. 1, and are designated by the same or analogous reference symbols. Thus, for example, the analogous symbols 2, 2a, 2b, 2C and 2d are used to designate the scrubbing space in Figs. 1, 2, 3, 4 and 5 respectively.

Figure 2:
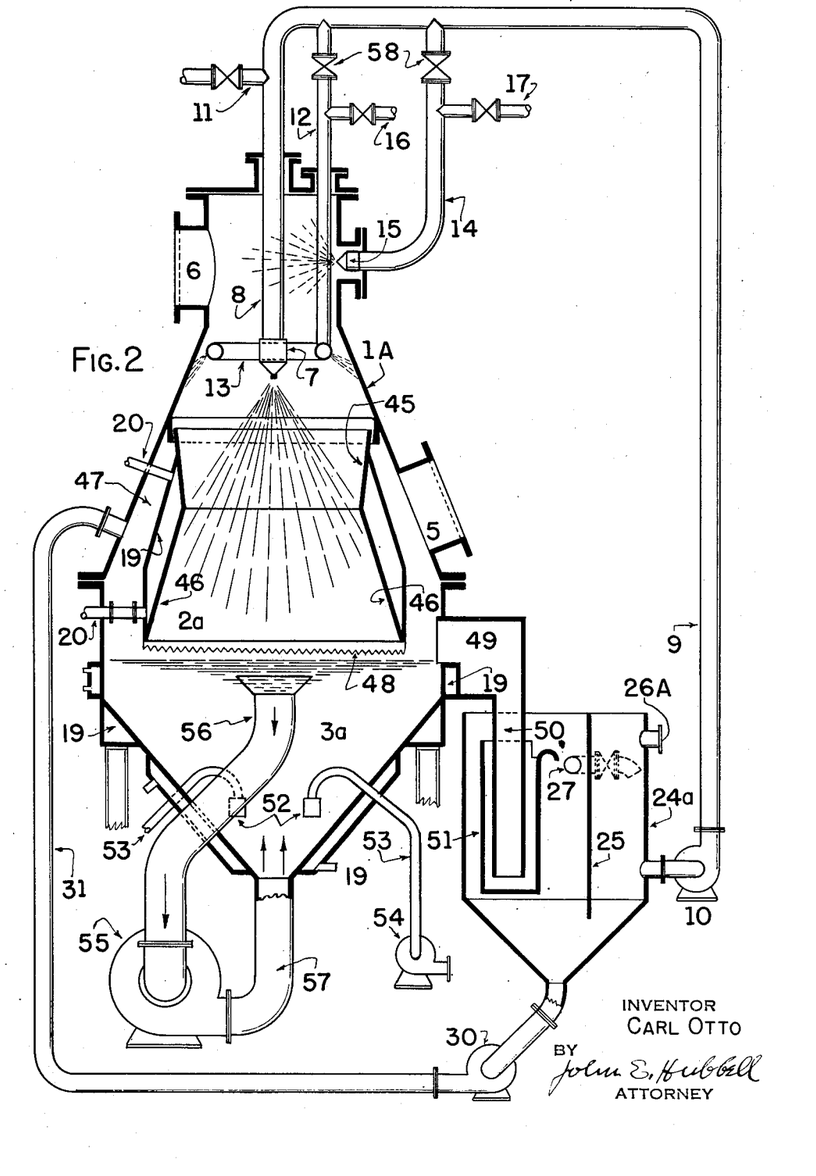
Figs. 2, 3, 4 and 5 are views generally similar to Fig. 1, and each illustrating a different modification of the apparatus shown in Fig 1.

While the apparatus unit shown diagrammatically in Fig. 2 is quite similar to the apparatus shown in Fig. 1 in many respects, it differs from the Fig. 1 apparatus in several material respects. For one thing, the scrubbing chamber or space 2a of Fig. 2 is surrounded by a wall including two hollow members 45 and 46, each of which is in the form of a truncated cone. Each of said members is spaced inwardly from the tank or shell 1a which encloses the scrubbing space 2a and crystallizing space 3a of Fig. 2. The elements 45 and 46 are coaxial but are tapered in the opposite direction, the base of the conical member 45 being at its upper end and the base of the conical member 46 being at its lower end. The diameter of the lower end of the member 45 is equal to the upper end diameter of the member 46. The latter is so disposed and proportioned relative to the location of the nozzle 7, and relative to the conical angle of the spray discharge by said nozzle that said spray is distributed substantially across the full cross-section of, and fills the member 46 so that most of said spray passes downward through the member 46 without contacting the latter. The members 45 and 46 collectively form a hollow walled skirt which includes a wall heating space 19 and which is spaced away from the surrounding, conical portion of the tank or casing 1A to provide an annular gas receiving space 47. The incoming gas passes into the space 47 through the inlet 5 at a level appreciably above the lower edge 48 of the member 46. That edge is serrated and breaks up the stream of gas which flows from the inlet port 5 downward through the space 47 into the space below the member 48 and above the bath liquor in the chamber 3a, and passes from said space upward into and through said space. The liquor flowing in film form down the inner surface of the member 46 is also broken up into drops which fall from the serrated bottom edge 48 of the member 46, and is the portion of the ammonium sulphate liquor with which the gas entering the apparatus first comes into contact.

In Fig. 2, the liquor level at the top of the crystallizing space or chamber 3a, is fixed by the height of an overflow outlet 49 which discharges the overflowing bath liquor passing through a depending pipe 50 into a seal pot 51. The latter is located in the tar chamber of a tar separator 24a generally like the tar separator 24 of Fig. 1. The pump 10 which passes liquor to the spray nozzles 7, 13 and 15 of Fig. 2, has its inlet connected to the chamber 24a at the clear liquor side of a vertical baffle 25 which divides the upper portion of the space into a tar chamber and a clear liquor chamber. The tar chamber has a valved tar outlet 27. The separate overflow receptacle 28 of Fig. 1 is omitted in Fig. 2, however. The overflow outlet 26a from the clear liquor chamber of the tar separator 24a may pass liquor into the mother liquor reservoir (not shown). In Fig. 2, crystals along with carrying liquor are withdrawn from the lower portion of the crystallizing space 3a to outlets 52, each connected to the suction pipe 53 of a corresponding slurry pump 54 which is arranged to pass the crystals and carrying liquor withdrawn, to crystal separator apparatus (not shown), as the pump 37 passes crystals and carrying liquor to the crystal separator 39 of Fig. 1.

The apparatus shown in Fig. 2 also differs from that shown in Fig. 1 in having a circulating pump 55 with an inlet pipe 56 extending through the wall of the chamber 3a and having its open upper end centrally disposed in the space 3a at a level a short distance below the overflow level through the outlet 49. The discharge pipe 57 of the pump 55 opens upwardly into the lower end of the hopper bottom portion of the chamber 3a. The pump 55 with its inlet and outlet connections forms an effective and regulable device for materially augmenting the recirculation effects of the pumps 10 and 30 of Fig. 2. With the pump 55 delivering a relatively strong, upwardly directed stream into the lower end of the chamber 3a, the smaller and lighter ammonium sulphate crystals suspended in the bath liquor, are largely kept away from the crystal outlets 52 in which the larger crystals are drawn, since the upflowing stream discharged through the pipe 57 exerts much greater opposition to the settling movement of small crystals than to the settling movement of the large crystals.

Except as already indicated, the operation of the apparatus shown in Fig. 2 is essentially like that of the apparatus shown in Fig. 1.

Fig. 3 illustrates apparatus advantageously different structurally and operatively from the apparatus shown in Figs. 1 and 2, in the following important respects:

The apparatus shown in Fig. 3 has its scrubbing space or chamber and its crystallizing space or chamber in separate tanks or receptacles; the Fig. 3 apparatus includes means for spraying finely divided liquor into one portion of the scrubbing chamber space and for spraying less finely divided liquor into another portion of said space which is so located that the coarser spray will absorb most of the fine spray entrained by the gas stream and thus minimize the amount of entrained liquor carried out of the scrubbing chamber by the outflowing gas; the apparatus shown in Fig. 3 includes a simplified and improved pumping arrangement; and includes liquor heating means by which the formation of small crystals and the growth of large crystals are subject to a desirable control.

The scrubbing chamber or space 2b of Fig. 3 comprises the entire space enclosed by a cylindrical, vertically disposed tank 60 with its lateral gas inlet 5 and gas outlet 6 respectively adjacent the lower and upper ends of the tank. The liquor sprayed into the chamber 2b does not accumulate therein, but passes through a bottom outlet opening into a liquor discharge pipe 61, and passes through the latter into the open upper end of a crystallizing tank or receptacle 62 kept substantially filled with bath liquor. The pipe 61 comprises a depending loop portion providing a liquid seal between the scrubbing chamber 2b in which the gas pressure is greater than the pressure of the atmosphere into which the discharge end of the pipe 61 opens. The pipe 61 is surrounded by a steam jacket 61'. The primary purpose of the pipe 61 is that of a conduit, but the desupersaturation of the ammonium sulphate liquor supersaturated in the scrubbing chamber 2b, is initiated in the pipe 61, and the latter may be regarded as an initial crystallizer or pre-crystallizer.

The main crystallizer tank or receptacle 62 is structurally similar to, and serves the tar separating purposes of the tar separator 24a of Fig. 2. The receptacle 62 includes a baffle 63 analogous to the baffle 25 of Fig. 2. The baffle 63 separates a clear liquor outlet compartment at its right from a tar receiving compartment at its left. The scrubber outlet pipe 61 discharges into said receiving compartment, as do the liquor return pipes 75 and 82 hereinafter described. Tar collecting in the upper end of the receiving compartment may be periodically removed by a manual skimmer, or by the use of a valved outlet (not shown), like the outlet 27 shown in Fig. 1 and in Fig. 2. Some of the liquor passing into the crystallizing receptacle 62 is withdrawn from the clear liquor compartment of the latter by a pump 10, and crystals settling in the lower, hopper bottom portion of the receptacle 62, are withdrawn along with carrying liquor by the slurry pump 68. Some of the liquor withdrawn from the receptacle 62 by the pump 68 is sprayed into the lower portion of the scrubbing chamber 2b, as is hereinafter described.

The pump 10 passes liquor withdrawn from the receptacle 62 through a pipe 9 including a liquor heater 64, to a spray device 7b, shown as comprising a single spray nozzle axially disposed in the chamber 2b, adjacent the upper end of the latter. The pump 10 also passes liquor from the tank 62 through the pipe 9, heater 64 and branch pipe 65 to a spray device 66 for spraying liquor into the scrubbing chamber 2b at a level substantially below the level of the spray device 7b.

In the form shown in Fig. 3, the spray device 66 comprises a bustle pipe surrounding the tank 60 and supplying liquor to a plurality of spray nozzles 67 extending through the tank wall and arranged to discharge sprays directed downwardly and toward the axis of tank 60. In the preferred form of the invention, the liquor sprayed into the chamber 2b through the nozzles 67 is much more finely subdivided than the liquor sprayed into the upper end of the chamber 2b through the nozzle 7b. In practice, the nozzles 67 are advantageously of one or another of the types used to "atomize" water and other liquids, and are adapted to subdivide the liquor which they spray into the chamber 2b into particles having an average diameter of less than one-half milimeter. As has been explained in my prior application Serial No. 3,133 filed on January 19, 1948, for the use of the general method disclosed and claimed herein, it is important that the spray nozzles employed are of the non-blocking type, so that they will not be blocked up by the crystal slurry pumped to them from the bottom of a container, such as the tank 1, or the crystallizer tanks 62, 62C or 3d of Figs. 3, 4 and 5, respectively. For example, the well known and widely used spray nozzles of the construction type shown in the Eneas Patent 1,101,264 of June 23, 1914, are well suited for this purpose. Preferably, the nozzle 7b, which may also be of well known form, is adapted to discharge liquor in the form of a relatively coarse spray consisting of particles having an average diameter of about two millimeters. The inlet spray nozzle 73 is advantageously one adapted to produce a relatively coarse spray.

In practice, the difference between the level of the nozzles 67 and the level of the nozzle 7b may be of the order of ten or fifteen feet, so that the pressure at which the liquor is supplied to the nozzles 67 exceeds the pressure at which the liquor is supplied to the nozzle 7b by several pounds per square inch. This difference in the supply pressures facilitates the maintenance of the desired difference in the size of the liquor droplets discharged by the nozzles at the different levels.

The rapidity with which ammonia is removed from gas into which liquor containing ammonia sulphate and sulphuric acid is sprayed, rapidly increases as the size of the liquor spray particles is reduced. The fine spray discharged by the nozzles 67 is thus a more efficient agent for removing ammonia from the gas stream, than is the coarser spray discharged by the nozzle 7b. The amount of spray liquor which the gas stream tends to entrain also increases rapidly as the size of the spray liquor particles decreases. In consequence, if all of the liquor sprayed into the scrubbing chamber were as finely divided as is the liquor sprayed through the nozzles 67, the amount of entrained liquor which the gas would carry out of the scrubbing chamber through its outlet 6, would be excessive. With the arrangement shown in Fig. 3, however, the coarse liquor spray particles discharged by the nozzle 7b and moving along distributed paths through the portion of the gas stream between the level of the nozzles 67 and the outlet 6, absorb or coalesce with most of the fine spray particles entrained by the adjacent upflowing gas, and are thus knocked out of or removed from the ascending gas stream before they reach the outlet 6.

The steam of coarse spray particles discharged into the ascending gas stream at one level, and the stream of finer spray particles discharged into the gas stream at some lower level, thus cooperate to insure a desirably high ammonia absorbing capacity, coupled with a desirably low rate at which entrained liquor is moved out of the scrubbing chamber by the gas. The simultaneous discharge of a plurality of spray streams into the scrubber space at a corresponding plurality of portions of the scrubber space displaced from one another along the length of the path of gas flow through said space increases the efficiency with which the ammonia content of a given volume of gas can be removed by a relatively small amount of spray liquor, regardless of whether the different spray devices discharge fine spray or coarse spray. Thus, I have found experimentally that when a relatively moderate amount of spray liquor is sprayed into the scrubber chamber in three generally similar spray streams, at three different levels, about ninety-two percent of the ammonia in the gas is removed by the lowermost spray, about ninety-nine percent of the ammonia in the gas is removed by the conjoint action of the two lowermost sprays, and that the three sprays collectively remove 99.75 percent of the ammonia content of the gas.

An increase in the ammonia absorbing capacity of the liquor sprayed into the scrubbing chamber, contributes to a decrease in the amount of such liquor required to absorb the ammonia, and permits a reduction in the bulk, and in the construction and operating costs of the apparatus required to recover the ammonia in a given volume of gas.

As previously noted, some of the liquor withdrawn from the crystallizer 62 by the pump 68 is sprayed into the scrubber chamber 2b. Thus, as shown in Fig. 3, liquor and crystals drawn from the crystallizer by the pump 68 are passed through the pump discharge pipe 69 to a classifier 70. The latter has an outlet connected through a valve 71 and pipe 72 to a spray nozzle 73 discharging into the lower end of the scrubbing chamber 2b. As diagrammatically shown, the nozzle 73 is located in the gas inlet passage 5 in position to discharge a spray into the lower portion of the chamber 2b.

The classifier 70 is a solid and liquid separating device which may be of the cyclone type and form largely used in the metallurgical art to separate finely divided solid matter from water. The classifier 70 of Fig. 3 normally operates to pass the major portion of the entering crystals into the classifier from the pump 68 through the classifier outlet 74 to a subjacent crystal separator 39. The latter may be of a conventional type customarily employed to separate ammonium sulphate crystals from carrying liquor. The relative amounts of liquor passing from the classifier 70 to the nozzle 73 and to the separator 39 may be regulated by relative adjustments of the valves 71 and 74. The adjustment of the valve 71 also regulates the pressure at which liquor is passed into the spray nozzle 73. As shown, the pipe 72 comprises a depending loop portion 72' forming a liquid seal between the classifier 70 and the scrubbing chamber 2b.

As diagrammatically shown, the liquor separated from the crystals in the separator 39 passes from the upper portion of the separator back into the crystallizer 62 through a return pipe 75. As shown, the pipe 75 includes a liquor heater 76, the purpose of which is hereinafter stated. The pipe 75 also serves to return liquor to the crystallizing chamber from the crystal dryer 77. The latter may be a continuous dryer of conventional type arranged to receive crystals and accompanying liquor from the bottom of the separator 39 through a normally open valve 78. When the latter is closed, the crystals and carrying liquor may also be returned to the crystallizer chamber 62 from the lower portion of the separator 39 through a normally closed valve 79 and pipe 80. Ordinarily, the valves 78 and 79 are respectively closed and open to pass crystals and liquor back to the crystallizer 62 only when the average size of the crystals settling into the lower portion of the separator 39 is smaller than is required to satisfy the existing crystal demand. The crystals then returned through the pipe 80 are given time and opportunity for further growth in the crystallizer chamber 62.

In Fig. 3, a conventional acid catcher of the cyclone separator type has its inlet connected directly to the outlet 6 of the scrubbing chamber 2b. The acidified liquor separated from the gas in said acid catcher 81 passes through the valved bottom outlet 83 and pipe 82 to the crystallizer chamber 62. Ordinarily and as shown, the pipe 82 includes a depending loop portion providing a liquid seal which prevents gas from blowing out of the separator 81 through the pipe 82. The gas leaves the acid catcher through the outlet pipe 84 which has its inlet end within the acid catcher and adjacent the lower end of the latter.

As those skilled in the art understand, the formation of minute so-called seed crystals may result from various changes in operating conditions, such for example as an increase in the rate at which ammonia is absorbed by the bath liquor in the scrubbing space, or a decrease in the temperature of the liquor. The over-production of seed crystals contributes directly to a reduction in the rate of crystal growth in the crystallizing chamber, and hence in the average size of the crystals produced.

The heaters 64 and 76 may be of any usual or suitable type. For example, they may be electric resistance heaters, but as diagrammatically shown, they are heaters of the tubular heat exchanger type with provisions for passing steam at regulable rates into their heating fluid spaces. The heater 64 forms a means for dissolving more or less of the small crystals entrained by the liquor drawn out of the crystallizing chamber 62 and moved through the heater 64 by the pump 10, and thus reduces the number of small crystals passed into the scrubbing chamber through the spray nozzles receiving spray liquor through the heater 64. The heater 76 may be used to dissolve more or less of the relatively small crystals returned from the separator 39 to the crystallizer 62 through the pipe 75. The dissolving action of small crystal content by the heating units 64 and 76 contribute to a reduction in the number of small crystals in the crystallizer 62, and thereby augments the crystal growth occurring in that chamber. In lieu of, or in addition to using the heaters 64 and 76, live steam may be injected into the corresponding liquor streams. Thus, as shown in Fig. 3, steam may be injected into the pipe 75, when and as desired, through a valved steam pipe 76'.

As diagrammatically shown in Fig. 3, make-up acid is fed through a pipe 11B into the portion of the crystallizer 62 immediately adjacent the outlet from the crystallizer to the pump inlet 10. Hot water alone, or in admixture with bath liquor for rock salt elimintaion or other cleaning purposes, may be passed into the inlet of the pump 10 through a valved pipe connection 16B and into the classifier 70 through a supply pipe 70'.

The apparatus shown in Fig. 3 is characterized by its mechanical simplicity. In addition to other advantages of the apparatus shown in Fig. 3, previously mentioned, the cost of construction of a scrubbing chamber 60 of large capacity, is reduced by making the enclosing tank in the form of a simple cylinder, rather than by giving it a tapered form such as is given the tanks 1 and 1a of Figs. 1 and 2, respectively. The cylindrical form of the tank 60 permits of an advantageous disposition in the tank of a suitable multiplicity of spray devices, and is less expensive to construct in large size units than is the tapered tanks shown in Figs. 1 and 2.

More or less of the crystal entraining liquor withdrawn from the scrubbing chamber 2b by the pump 68, may be returned to said chamber through the nozzle 73 without making use of the classifier 70. Thus as is shown in Figure 3A, the upper ends of the pipes 72 and 69 may be directly connected through the valve 71, and the pipe 69 may also be connected to the valve 74 for the passage of crystals and liquor into the separator 39. The supply to the lower Fig. 3 spray nozzle 73, of liquor having an acid content substantially the same as the acid content of the liquor passing away from the scrubbing space, and hence appreciably lower than the acid content of the liquor supplied to the more elevated spray nozzles of Fig. 3 in consequence of the inclusion in the last mentioned liquor of the make up acid supplied through the pipe 11B, is advantageous for two reasons. First, owing to the relatively high ammonia content of the gas when it first enters the scrubbing space of Fig. 3 through the gas inlet 5, the absorption of the ammonia by the liquor sprayed into contact with the gas would result in an undesirably rapid supersaturation of the contacting spray liquor and the formation of an undesirably large number of small new crystals, if the acid content of the contacting liquor were appreciably higher than the acid content of the liquor passing out of the scrubbing space. Second, the higher acid content in the liquor sprayed through the nozzles 7B and 67 into contact with gas from which a substantial portion of its initial ammonia content has been absorbed, reduces the amount of liquor discharged through the last mentioned nozzles which is needed to suitably lower the ammonia content of the gas leaving the scrubbing space. The discharge of a relatively coarse spray through the nozzle 73 makes the supersaturation effect less pronounced than it would be if the spray were finer.

The form of the invention shown in Fig. 4 closely resembles that shown in Fig. 3, except that in Fig. 4 only a single liquor pump is used. In Fig. 4 the pump 68 serves the same purposes served by it in Fig. 3, and serves in addition to supply liquor to the inlets of the spray devices 7b and 67. Liquor and entrained crystals or slurry, withdrawn from the crystallizer 62C of Fig. 4 by the pump 68, pass through the discharge pipe 69 to the classifier 70 and pass from the latter through a lower valved outlet 74 and through an upper outlet valve 71 and pipe 72, as in Fig. 3. In Fig. 4, however, the pipe 72 in addition to passing liquor to the spray nozzle 73, passes liquor through a branch pipe 85 and associated distributing means to spray nozzles 7b and 67. The arrangement of the latter, shown in Fig. 4, is like that shown in Fig. 3. Advantageously, however, the portion of the pipe 72 individual to the nozzle 73, includes a throttling valve 86.

The branch pipe 85 of Fig. 4 discharges into a classifier 87, which may be a counterpart of the classifier 70. The bottom outlet from the classifier 87 is connected through a valve 88 to branch pipes 89 and 90. The pipe 89 supplies spray liquor to the nozzle 7b, and the pipe 90 supplies spray liquor to the bustle pipe 66 and thereby to the spray nozzles 67. The branch pipes 89 and 90 include regulating valves 91 and 92, respectively. The valve 88 is shunted by a by-pass connection which includes valve 93 and a liquor heater 94, and a pipe 95 connecting the heater 94 to the connected ends of of the valves 88, 91 and 92. By suitable adjustment of the valves 71, 86, 88, 91, 92 and 93, the relative amounts of liquor passed to the nozzles 7b and 73 and to the group of nozzles 67, may be varied as desired. Furthermore, the pressures at the inlets to the nozzles 7b and 73, and at the inlet to the bustle pipe 66, may be varied as conditions make desirable. The heater 94 forms a means for controlling the amount of small crystals passing into the scrubbing chamber 2b through the nozzles 7b and 67. Instead of using the heater 94, live steam may be passed into the pipe 95 through the valved pipe connection 95'.

The pump simplification of Fig. 4 is thus attended by a desirable flexibility of control of the relative amounts of spray liquor supplied to the various spray nozzles, and the pressures at which the liquor is supplied to the nozzles. The apparatus shown in Fig. 4 also differs from that shown in Fig. 3 in the omission of the crystallizer baffle 63 which may also be omitted from the Fig. 3 arrangement. As shown in Fig. 4, hot water, or hot water admixed with liquor may be passed to the inlet of the pump 68 through a pipe 16C, and make-up sulphuric acid may be supplied through a pipe 11C which opens into the hopper bottom portion of the crystallizer 62C, adjacent the outlet from the crystallizer connected to the inlet of the pump 68. The general operation of the apparatus shown in Fig. 4 may be like the apparatus shown in Fig. 3, except as already noted.

In Fig. 5 I have illustrated a relatively simple and compact structural arrangement of apparatus for converting the ammonia in distillation gas into ammonium sulphate, in which the scrubbing chamber 2d and the crystallizing chamber 3d are in separate receptacles as in Figs. 3 and 4. The scrubbing chamber 2d of Fig. 5 is enclosed by a cylindrical tank 100, having a hopper bottom and a depending coaxial liquor outlet pipe 101. The latter is open at its upper end to the chamber 2d and has its lower end submerged in the liquor held in the receptacle 102. The latter is open at its upper end and forms the surrounding and bottom walls of the crystallizing chamber 3d. The pipe 101 and chamber 102 cooperate to form a liquor sealed connection between the lower ends of the scrubbing chamber 2d and crystallizing chamber 3d. The wall of the chamber 3d is made hollow to serve as a steam heating jacket space 103 for said chamber. Similarly, the output pipe 101 is formed with a double wall to provide an annular steam heating space 104.

Liquor is withdrawn from the crystallizing chamber 3d at an upper level, by a pump 10 which passes the liquor to the scrubbing chamber 2d through a spray nozzle 7d carried by the depending outlet end portion of the pump discharge pipe 105. A depending upper end portion of the pipe 105 passes centrally into the upper end of the chamber 2d through the top wall 106 of the tank 100. Make-up acid may be passed into the inlet of the pump 10 through a valved pipe 11d. As shown, the inlet of the pump 10 is connected to a ring shaped trough 107 extending horizontally around the vertical axis of the chamber 3d. Liquor overflows from the crystallization receptacle 102 through an overflow pipe 108 which discharges into a tar separator 109 which as shown, is similar in type to the tar separator 24a of Fig. 2, and is provided with a similar valved tar outlet 27. In Fig. 5, the bottom outlet of the tar separator is connected to the inlet of the pump 110 which returns liquor to the upper end of the chamber 3d through a pipe 111.

A pump 112 draws liquor from the clear liquor chamber of the tar separator 109, and passes it through a valve 113 and pipe 114 to a spray ring 115 carried at the underside of the upper top plate 106 of the tank 100. The spray ring 115 discharges liquor against the inner wall of the upper portions of the scrubbing chamber 2d, and against the outer surface of the portion of the pipe 104 extending downward from the underside of the top wall plate 106. As shown, a branch from the pipe 114 supplies liquor to a nozzle 116 which discharges liquor against the inner wall surface of the tank 100 adjacent its gas outlet 6. Another pump 117 draws liquor from the clear liquor chamber of the tar separator and discharges it into the lower portion of the scrubbing chamber 2d through a spray valve 73' which may be similar in location, form and general operative effect to the spray valves 73 of Figs. 3 and 4. Hot water may be passed into the pipe 114 through a valved pipe 16d opening to the pipe 114 at a level above the valve 113. Hot water may also be passed into the nozzle 73' through a valved pipe 16e. The operation of the apparatus shown in Fig. 5 may be generally like that of the apparatus shown in Figs. 3 and 4 except as a result of the omission from Fig. 5 of fine spray nozzles, like the nozzles 67 of Figs. 3 and 4, below the central upper nozzle 7d.

The exothermic reaction in which free ammonia combines with acidified ammonium sulphate liquor used in recovering ammonia from coke oven or analogous distillation gas, results in the evaporation in the scrubbing space of any of the forms of apparatus shown, of some of the water present in such liquor. Such evaporation tends to increase the supersaturation of the unevaporated residue of the liquor. The pressure and temperature in the scrubbing space are higher than the pressure and temperature respectively, of the ambient atmosphere. In consequence, there is an evaporation into the ambient atmosphere of some of the water content of the ammonium sulphate liquor. The effect of such evaporation to the atmosphere of liquor passing into the crystallizer shell and at the upper surface of the liquor therein as shown in Figs. 3, 4 and 5, contributes to a desirable reduction in the temperature and in the ammonium sulphate content of liquor desupersaturated in the open crystallizing chamber.

In all of the forms of the invention illustrated, the liquor in the portion of the crystallizer space immediately adjacent the outlet from which the liqpor to be sprayed to the scrubbing space is withdrawn, is ordinarily in its normally saturated condition. However, as a result of variations in operating conditions, the liquor withdrawn for spraying purposes may be occasionally slightly undersaturated or slightly supersaturated. In regular operation, however, the undersaturation is negligibly small and the extent of supersaturation is much less than that of the liquor returned to the crystallizer from the scrubbing space. The average condition of the liquor withdrawn for spraying purposes may thus be designated as an approximately saturated condition, and is so designated in some of the appended claims.

In each of my prior applications, Serial No. 668,392, filed May 9, 1946; Serial No. 659,444, filed April 4, 1946; Ser. No. 674,334, filed June 4, 1946; Ser. No. 720,593, filed January 7, 1947; Ser. No. 771,196, filed August 29, 1947, all now abandoned; and Ser. No. 3,133, filed January 19, 1948, I have disclosed subject matter which is claimed generically or specifically in the present application, which is a continuation in part of each of said prior applications.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. The method of continuously producing sulphate of ammonia which comprises passing into a substantially unobstructed scrubbing space a gas containing free ammonia, contacting such gas with saturated ammonium sulphate solution containing free sulphuric acid, withdrawing ammonium sulphate liquor to make up such solution from a body of ammonium sulphate liquor in a crystallizing space below said scrubbing space, said contacting being effected by spraying by whirling motion and under such pressure so as to disperse said solution in fine spray over substantially the whole cross sectional area of the space and permit solid crystalline particles and supersaturated liquid spray to fall into said body whereby the growth of ammonium sulphate crystals in said body is promoted, withdrawing crystals from said crystallizing space and adding sulphuric acid to the liquor to make up for the acid combining with ammonia in the scrubbing space.

2. A method as specified in claim 1, in which the liquor introduced into said scrubbing space entrains ammonium sulphate crystals.

3. A method as specified in claim 1, in which the liquor dispersed throughout said scrubbing space is in the form of spray particles having an average diameter of less than two millimeters.

4. A method as specified in claim 1, in which the acid content of the liquor sprayed into the scrubbing space adjacent such gas inlet is about 5 or 6 per cent by weight, and in which the acid content of the liquor sprayed into said scrubbing space more remote from said inlet exceeds the first mentioned acid content.

5. In the continuous production of sulphate of ammonia, the method which consists in moving gas having a small ammonia content through a scrubber space between a lower gas inlet to, and an upper gas outlet from said space, passing acidified ammonium sulphate liquor in the form of a coarse spray into a portion of said space and passing acidified ammonium sulphate liquor in the form of a relatively fine spray into a portion of said space nearer to said inlet than the first mentioned portion, said coarse spray consisting of liquor particles having an average diameter not less than two millimeters and said fine spray consisting of fine particles having an average diameter of not greater than one-half millimeter.

6. In the continuous production of sulphate of ammonia, the method which consists in moving gas having a small ammonia content through a scrubber space between a lower gas inlet to, and an upper gas outlet from said space, passing acidified ammonium sulphate liquor in the form of a relatively coarse spray into an upper portion of said space and passing acidified ammonium sulphate liquor in the form of a relatively fine spray into an intermediate portion of said space, and spraying liquor in the form of a relatively coarse spraying into a lower portion of said space adjacent said gas inlet.

7. The method of continuously producing sulphate of ammonia which comprises passing into a substantially unobstructed scrubbing space a gas containing free ammonia, contacting such gas with saturated ammonium sulphate solution containing free sulphuric acid and entraining solid crystalline particles and reacting with the free ammonia to form supersaturated ammonium sulphate liquor, withdrawing supersaturated ammonium sulphate liquor from said scrubbing space and desupersaturating the latter to make up all of said solution used in carrying out the method from a body of ammonium sulphate liquor in a crystallizing space below said scrubbing space, said contacting being effected by spraying under such pressure so as to disperse said solution in fine spray over substantially the whole cross sectional area of the space and permit solid crystalline particles and supersaturated liquid spray to fall into said body whereby the growth of ammonium sulphate crystals in said body is promoted, withdrawing crystals from said crystallizing space and adding sulphuric acid to the liquor at a rate so related to the rate at which the ammonia containing gas is passed into said scrubbing space as to effect the reaction of substantially all of the ammonia in the gas with the acid, and make up for the acid combining with ammonia in the scrubbing space.

8. A method as specified in claim 7, in which the gas passes first through an inlet portion and thence through an outlet portion of said scrubbing space, and including the step of adding make-up acid mainly to the liquor sprayed into the last mentioned portion of the scrubbing space.

9. In removing ammonia from coke oven gas by spraying acidulated sulphate of ammonia liquor into contact with the gas in a scrubbing space surrounded by a wall formed of acid resisting plate, the method which consists in spraying liquor into said space to disperse the sprayed liquor therein, and to maintain a layer of supersaturated liquor on the inner side of said wall, and applying heat to the outer side of said wall to lower the saturation point of the liquor in said layer and thereby prevent salt incrustations on the inner side of the wall.

10. By-product coke oven apparatus for the production of ammonium sulphate crystals, comprising structure enclosing a scrubbing chamber having a gas inlet adjacent its lower end and a gas outlet adjacent its upper end, and a liquor outlet below the level of said gas inlet, spraying devices arranged in said chamber at different levels, a crystallizer comprising a liquor container and a pipe bent to form a liquor seal and having one end portion connected to the lower end of said chamber to receive liquor therefrom and having its second end portion above said container and arranged to discharge liquor into the latter and having an intermediate portion in the form of a depending loop, a pump having an inlet connected to said liquor container for withdrawing liquor and crystals entrained therein from said container and having a discharge pipe line connected to and discharging liquor and crystals through said spraying devices, a separator device for separating crystals from liquor, a branch pipe including a regulating device connecting said pipe line to said separator device, and means for admixing sulphuric acid with the liquor to be supplied to the spraying devices.

11. Apparatus as specified in claim 10 including a crystal classifier having an inlet connected to said discharge pipe line and having an outlet connected to and passing liquor and crystals to at least one of said spray devices, and having a second outlet for the discharge of crystals not passed to any of said spraying devices.

12. By-product coke oven apparatus for the production of ammonium sulphate crystals, comprising structure enclosing a scrubbing chamber having a gas inlet adjacent its lower end and a gas outlet adjacent its upper end and a liquor outlet below the level of gas inlet, spray devices arranged in said chamber at different levels, a crystallizer comprising a liquor container and a pipe bent to form a liquor seal and having one end portion connected to the lower end of said chamber to receive liquor therefrom and having its second end portion above said container and arranged to discharge liquor into the latter, and having an intermediate portion in the form of a depending loop, a first pump having an inlet connected to said liquor container for withdrawing liquor therefrom and having a discharge pipe line connected to and discharging through one of said spray devices, a second pump having an inlet connected to said liquid container for withdrawing liquor therefrom at a level different from that at which the inlet of the first pump is connected to said container, and having a discharge pipe line connected to and discharging through another of said spraying devices at a level different from the level of the spraying device through which the first pump discharges, a separator device for separating crystals from liquor, and a pipe connecting the discharge pipe line of one of said pumps to said separator for passing liquor and crystals into the latter.

13. In a coke oven by-product plant including apparatus for producing ammonium sulphate crystals by scrubbing coke oven gas containing ammonia with an acidified ammonium sulphate solution, the combination with structure formed with a crystallizing space and a substantially unobstructed scrubbing chamber, the latter having a lower liquor and crystal outlet arranged to discharge into said space, and having a gas inlet and a gas outlet each spaced away from the other and from said liquor and crystal outlet, nozzle means comprising first and second non-blocking spray nozzles mounted in said structure and arranged to discharge a liquor spray and crystals into portions of said chamber respectively adjacent and remote from said gas inlet, conduit means connected to said structure and communicating with said chamber for passing coke oven gas through said gas inlet and for withdrawing gas from said chamber through said gas outlet, means connected to said structure for withdrawing saturated ammonium sulphate liquor and crystals from said crystallizing space and spraying said liquor and crystals into said chamber comprising one pump having an inlet conduit connected to said crystallizing space at one level and an outlet conduit connected to said second nozzle, and comprising a second pump having an inlet connected to said crystallizing space for withdrawing liquor therefrom at a level lower than the first mentioned level and having a discharge pipe line connected to and discharging through said first nozzle, a separator device for separating crystals from liquor, and a pipe connecting said discharge pipe line to said separator for passing crystals and liquor into the latter, and means for adding make-up sulphuric acid to the liquor passing from said crystallizing space to said nozzle means.

14. In a coke oven by-product plant including apparatus for producing ammonium sulphate crystals by scrubbing coke oven gas containing ammonia with an acidified ammonium sulphate solution, the combination with structure formed with a crystallizing space and a substantially unobstructed scrubbing space, and including wall structure surrounding said crystallizing space and said scrubbing space, non-blocking spray nozzles mounted in said structure, said scrubbing space having a lower liquor and crystal outlet arranged to discharge into said crystallizing space, and having a gas inlet and a gas outlet each spaced away from said nozzles, each of said nozzles being arranged to discharge a liquor spray and crystals into an adjacent portion of said scrubbing space, said nozzles being arranged to disperse said spray over substantially the whole cross sectional area of said scrubbing space, gas conduit means connected to said structure and communicating with said scrubbing space for passing coke oven gas into said scrubbing space through said gas inlet and for withdrawing gas from said scrubbing space through said gas outlet, means connected to said structure for withdrawing saturated ammonium sulphate liquor and crystals from said crystallizing space and spraying said liquor and crystals into said scrubbing space and comprising pumping means having inlet conduit means connected to said crystallizing space for the withdrawal of liquor and crystals therefrom, and having outlet conduit means for discharging liquor and crystals withdrawn from the crystallizing space and including a separate conduit connection to each such nozzle, and means for adding make-up sulphuric acid to the liquor passing from said crystallizing space to said nozzle means, at a rate so related to the rate at which the gas containing ammonia is passed into said scrubbing space that substantially all of the ammonia in the gas reacts with the sulphuric acid to form ammonium sulphate liquor and crystals, whereby substantially all of the ammonium sulphate liquor sprayed into said scrubbing space is liquor which has been previously withdrawn from said scrubbing space.

15. Apparatus as specified in claim 14, in which said gas conduit means includes a gas supply pipe having a horizontal discharge end portion for passing a stream of coke oven gas horizontally through said gas inlet and through a portion of said scrubbing space adjacent to said gas inlet and in which a portion of the liquor spray discharged by said spray nozzles is passed into said scrubbing space portion adjacent said gas inlet.

16. Apparatus as specified in claim 14, including a pipe connected to said inlet conduit, means for connecting the latter to a source of cleaning fluid, and a valve in said pipe, whereby when said valve is open, cleaning fluid is sprayed into said scrubbing space through said non-blocking nozzles.

17. Apparatus as specified in claim 14, in which said structure includes a vertical tubular shell formed of acid resisting metal plate material and constituting a wall surrounding said scrubbing space, and heating means external to said wall for passing heat into the outer side of said wall, whereby liquor spray discharged by said spray nozzles and supersaturated by contact with the ammonia containing coke oven gas and impinging against and forming a liquid film on the inner side of said wall, has its saturation point lowered, and salt incrustation on the inner side of the wall thereby prevented, by the heat passed into the wall by said heating means.

18. Apparatus as specified in claim 14, in which the structure forming the crystallizing space includes a vertically disposed, open ended pipe having its upper end open to receive ammonium sulphate liquor and crystals passing downward through said scrubbing space, and a receptacle of a larger horizontal cross section than said pipe and into which said pipe depends and which cooperates with said pipe to form a crystallizer space external to said pipe and receiving liquor adjacent its lower end through the open lower end of said pipe, first and second conduit connections to said receptacle at respectively low and high levels, said first conduit connection forming a portion of said pumping means through which the latter passes liquor and crystals to said separator, and said second conduit connection forming a portion of said pumping means through which the latter passes liquor and entrained crystals to said spray nozzles, a second receptacle, and an overflow connection through which liquor in the first mentioned receptacle above said relatively high level overflows into said second receptacle.

19. In a crystallizing and reaction tank system for producing crystals of $(NH_4)_2SO_4$ by reaction of ammonia containing gas with $H_2SO_4$ solution, tank apparatus comprising a reaction tank section and a crystallizing tank section, said reaction tank section having an inlet for a conduit for passing the ammonia containing gas into an inlet portion of said reaction tank section, a spray nozzle with fluid rotating passage walls located adjacent said inlet so as to immediately contact the entering gas with spray reaction with the ammonia containing gas, a plurality of spray nozzles with fluid rotating passage walls located in an unobstructed portion of said reaction section, displaced from said inlet section, and arranged to cover the cross sectional area of said unobstructed portion with spray, and an outlet conduit for gas in said unobstructed portion, said crystallizing tank section being arranged to receive solution and crystals moving down from the bottom of said reaction tank section to said crystallizing tank section, a suspension conveying system including said crystallizing tank section, pumping means for conveying a suspension of crystals from a portion of said crystallizing tank section containing relatively large crystals to a crystal separating device, and conduit means connected to a portion of said conveying system which follows said portion containing relatively large crystals and which includes conduits through which suspensions of crystals are passed to the spray nozzles in the unobstructed portion of said reaction section and inlet means for the addition of fresh acid to said suspension conveying system.

CARL OTTO.

REFERENCES CITED

The following references are of record in the file of this patent:

UNITED STATES PATENTS

| Number | Name | Date |
|---|---|---|
| 441,106 | Monsanto | Nov. 18, 1890 |
| 1,799,478 | Peebles | Apr. 7, 1931 |
| 1,932,674 | Pyzel | Oct. 31, 1933 |
| 2,000,038 | Schwalenbach | May 7, 1935 |
| 2,035,441 | Allen et al. | Mar. 31, 1936 |
| 2,045,301 | Langer | June 23, 1936 |
| 2,288,667 | Allen et al. | July 7, 1942 |
| 2,375,922 | Jeremiassen | May 15, 1945 |
| 2,409,790 | Otto | Oct. 22, 1946 |
| 2,424,205 | Otto | July 15, 1947 |
| 2,424,207 | Otto | July 15, 1947 |
| 2,450,095 | Seebold | Sept. 28, 1948 |
| 2,482,643 | Tiddy | Sept. 20, 1949 |
| 2,549,848 | Otto | Apr. 24, 1951 |

OTHER REFERENCES

Fessenden, The Register of Arts, published in 1808 (page 87), C & A Conrad & Co., Philadelphia.